United States Patent [19]
Halasz et al.

[11] 3,857,924
[45] Dec. 31, 1974

[54] PROCESS FOR PREPARING SILICA PARTICLES

[76] Inventors: István Halász, Kobenhuttenweg 56, Saarbrucken; Imrich Sebestian, Fasanenweg 12, Dudweiler, both of Germany

[22] Filed: Nov. 2, 1972

[21] Appl. No.: 303,288

[30] Foreign Application Priority Data
Nov. 5, 1971   Germany............................ 2155045

[52] U.S. Cl. ............. 423/338, 252/313 S, 252/451, 423/339
[51] Int. Cl............................................ C01b 33/12
[58] Field of Search................... 423/338, 339, 335; 252/313 S, 448, 451

[56] References Cited
UNITED STATES PATENTS
2,921,839   1/1960   Ritter.................................. 252/448
FOREIGN PATENTS OR APPLICATIONS
1,141,334   1/1969   Great Britain...................... 423/338
1,244,745   12/1960  Germany............................ 423/338

OTHER PUBLICATIONS

Sebestian, "Preparation of Stable Sols. of Silicon Dioxide by Ion Exchange Process," Chem. Abst., Vol. 73, 1970, pp. 38990t.
Vail, "Soluble Silicates their Properties and Uses," Vol. 2, 1952, p. 560, Lines 24–27.

Primary Examiner—Oscar R. Vertiz
Assistant Examiner—Ethel R. Cross
Attorney, Agent, or Firm—Burgess, Dinklage & Sprung

[57]                ABSTRACT

Substantially pure, spherical, porous silica particles are prepared by
1. treating an alkali polysilicate solution having a silica content of from 5 to 7.5 percent by weight first batchwise with a cation exchange material to remove cations; and thereafter batchwise with an anion exchange material to remove mineral acids;
2. emulsifying and coagulating the treated solution from (1) in a water immiscible organic medium thereby forming the silica particles; and
3. recovering the silica particles.

5 Claims, No Drawings

PROCESS FOR PREPARING SILICA PARTICLES

BACKGROUND

The invention relates to a process for the production of spherical, porous silica particles.

Such silica products have surfaces covered with a certain amount of silanol groups and are used as static phases in chromatography, in catalytic processes as catalysts, as carriers for catalytically active materials, and so on. The silica particles are characterized by a desired particle size, pore structure and specific surface. In many cases the porous particles should only consist of silicon dioxide, if possible, without any ion impurities.

It is known that porous silica can be produced as spherical particles. Spherical silica gel can be prepared by centrifugation of silica-sol in organic liquids. According to another process, similar products are obtained after acidification by spraying sodium silicates through an oil layer. When dropping a silica-sol into kerosine or mineral oil at 38° C spherical silica gel are also obtained.

According to another process, silicious sol is sprayed below the boiling point or at increased temperatures in a gaseous atmosphere. Spraying of a sodium silicate solution into an $AlCl_3$-solution or sulfuric acid is also known. Spherical silica particles are also obtained by coagulation of silicious sol in a liquid that is immiscible with water. Silicious sol is a sodium silicate solution and sulfuric acid. The product contains up to 10.0 percent by weight $Na_2O$ and is baked at temperatures between 400° and 800° C.

The products obtained by the foregoing processes contain too many impurities (ions) which can adversely affect chromatographic separations, catalysis, and so on. Moreover, in prior methods the resulting silica particles have diameters generally too big (e.g., a few mm) for chromatographic separation columns.

SUMMARY

The process of the invention for preparing substantially pure, spherical, porous silica particles comprises
a. treating an alkali polysilicate solution having a silica content of from 5 to 7.5 percent by weight
   i. batchwise with a cation exchange material to remove cations; and
   ii. thereafter batchwise with an anion exchange material to remove mineral acids;
b. emulsifying and coagulating the treated solution from (a) in a water immiscible organic medium thereby forming said silica particles; and
c. recovering said silica particles.

According to the process of the invention, substantially pure silica particles are obtained. It is thus possible to obtain a total metal oxide content of the silica particles of less than 1.0 percent by weight. By controlling and changing the stirring and vibration speeds during emulsification and coagulation step (b) and/or the viscosity of the organic medium, a defined grain size distribution of the silica particles in the range of 0.001 to 3.0 mm can be produced with the formation of a predominant portion having a narrow grain size distribution. Another advantage of the process of the invention is the fact that inexpensive alkali polysilicates, especially water glass (sodium silicate) can be used.

DESCRIPTION

If the silica-concentration of the initial solution is lower than 5 percent by weight, the coagulation speed is slow, e.g., hours are required instead of minutes according to the invention. Over 7.5 percent by weight the coagulation speed is fast but unwanted large silica particles are formed. In the latter case, particle size cannot be practically controlled by varying the stirring speed during step (b).

The treatment of silicate solutions having a silica content of less than 4 percent by weight with cation and anion exchange materials has been used in a continuous process for the production of silicious sol.

The present invention, however, intentionally departs from the continuous process and has discovered that only a discontinuous batch operation in the stated silica concentration range guarantees the desired results, that is, pure silica particles.

The ion exchange materials are periodically added and removed after affecting the ion exchange. In the process of the invention, known pretreated strong cation and anion exchange resins can be used.

In a continuous process, the silica concentration cannot be controlled during regeneration when the column is filled with silica free water because of migration in the column. The necessary time for the coagulation can be adjusted only with difficulty to suit the change in silica concentration and cannot be reproduced. The exact adjustment of the coagulation time as is possible in the invention makes it possible to produce narrow sieve fractions and the required spherical form for the silica particles.

A further drawback of the continuous process carried out in an exchange column for contact and treating with an ion exchange material is the fact that coagulation will take place in the column itself when treating solutions having a silica content of from 5 to 7.5 percent by weight. This coagulation in the column results in blockage of the ion exchange material and the tendency for coagulation to occur is increased where a silicate solution is first treated with a cation exchange material and then an anion exchange material because of the fact that the silicate solution is unstable after the cation exchange treatment. It is also known that the tendency for coagulation to occur in the column is a function of the pH of the solution.

The alkali polysilicate solution treated according to the initial step of the invention is emulsified and coagulated by stirring it into an organic medium which is insoluble and immiscible with water. Examples of suitable organic mediums include neutral oils such as mineral oil, parafin oil and the like. Suitable neutral oils have a viscosity preferably in the range of from 4 to 40 centiposie.

Because of the initial purification step of the invention, the treated alkali polysilicate solution does not contain ion impurities that will stabilize the treated solution thereby prevent or delay coagulation to form the desired silica particles. The treatment step with the ion exchange materials produces a colloidal solution that is just at its isoelectric point; that is, it will coagulate to form pure, spherical silica particles.

Using the process of the invention, coagulation is effected in 2 to 60 minutes. The coagulation speed depends on the silica concentration of the liquid phase, but it is independent from the stirring speed. The stirring speed is related to the particle size and the optimal stirring speed depends on factors such as the dimensions of the equipment. In the examples, 200 to 900 rotations per minute are used.

The organic phase or medium is filtered or decanted from silica particles as the initial step in recovering same. The particles are cleaned of oil residues by washing several times with water, optionally after the addition of a wetting agent, for example a soap solution, or organic solvents such as alcohols, acetones, diethylether and the like afterwards. The particles are then dried using a temperature depending on the washing medium used. It is possible to prepare silica particles with certain particle diameter by adjusting and controlling the stirring speed and the viscosity of the organic medium.

By heating the silica particles formed, which can have a specific surface area of hundreds of m²/g, with water in an autoclave at higher temperatures, causing a hydrothermic reaction to take place, it is possible to lower the specific surface to several m²/g or less and increase the pore radius at the same time. Suitable temperatures for this reaction are in the range of 100° to 300° C.

The present invention is further described by the following examples:

EXAMPLE 1

20 ml of commercial sodium silicate (sold under the name water glas No. 5621 by Merck A. G., West Germany, containing about 7.8 wt. percent $Na_2O$ and about 26.1 wt. percent silica) with a density of 1.37 were diluted with 90 ml water. A strong cation exchanger resin based on a sulfonated resin made by the copolymerization of styrene and divinylbenzene (sold under the name Lewatit S-100) was added to the solution with stirring until the pH-value was about 1 to 2. Then further 2 to 3 ml cation exchange resin were added. After stirring for 15 to 30 minutes the cation exchange resin was filtered off. Stronger mineral acids (HCl, $H_2SO_4$ and so on) are removed by adding about 5 ml of an anion exchange resin based on a resin made by the copolymerization of styrene and divinylbenzene having

groups (sold under the name Amberlite IRA-400) *and straight run gasoline (boiling range 150-180°C) to the solution with stirring. The resin is then filtered off after about 15 sec.

The resulting treated polysilicious acid solution had a silica content of 6.6 percent by weight and a pH-value of 4.5 to 5. It was then poured with stirring at different speeds into 300 ml of a mixture of engine oil (Energol HP20 of Brit. Petroleum Comp.)* having a viscosity of 26 centipoise, emulsified and coagulated with steady stirring. The coagulation time (4 to 6 minutes) was measured by means of a reference sample. After the coagulation, the product was stirred for 3 minutes more and after the silica particles had settled, the oil was decanted.

The silica particles were mixed with water, stirred shortly and after the decantation of the particles the oil layer was removed. Afterwards they were washed with a soap solution and water, settled for about 12 hours (aging) and then heated at 25° C for an hour, filtered, washed with methanol, dried at 120° C and sieved out.

At a stirring speed of 200 rotations per minute, most of the $SiO_2$-pellets had a particle diameter of 120–200 $\mu$; at 500 rotations per minute, 50 – 120 $\mu$; at 700 rotations per minute, 33 – 100 $\mu$; and at 900 rotations per minute, 20 – 76 $\mu$.

10 g silica particles produced were treated three times with HF and $H_2SO_4$, and the residue was dried at 500° C. The sulfate residue was 0.91 percent by weight. According to chemical analysis, the silica particles contained 0.22 percent by weight $Na_2O$ and 0.11 percent by weight $Me^{III}_2O_3$ ($Fe_2O_3$, $Al_2O_3$ and so on).

EXAMPLE 2

20 ml of sodium silicate (water glass) was used in Example 1 having a density of 1.37 were diluted with 100 ml water and treated with cation and anion exchangers as in Example 1. The treated polysilicious acid solution contained 6.1 percent by weight of silica was emulsified in oil and recovered as described in Example 1.

The coagulation was slower than in Example 1 and was affected in about 20 minutes.

EXAMPLE 3

Pure, treated polysilicious acid solution was obtained as described in Example 1 and poured in 300 ml engine oil having different viscosities by adding varying amounts of straight run gasoline accor. to examp. 1 with stirring at a constant stirring speed of 500 rotations per minute. After coagulation, silica particles were treated as described in Example 1.

The major portion of the silica particles had, when using an oil viscosity of 4 cP, a particle diameter of 100 – 300 $\mu$; at 8 cP, 80 – 150 $\mu$; and at 39 cP, 30 – 100 $\mu$.

EXAMPLE 4

Pure, treated polysilicious acid solution was produced as described in Example 1, poured into engine oil mixture having a viscosity of 8 cP and emulsified using a shaking machine. After coagulation the oil was filtered, the silica particles were washed with a soap solution and water, afterwards dried at 105° C and sieved out. The major portion of the silica particles had a particle diameter of 0.5 to 3.0 mm.

EXAMPLE 5

Silica particles, produced as in Example 1, having a specific surface of 440 m²/g were heated in an autoclave with water for 3 hours at temperatures below stated. The specific surface was determined according to the BET-method (according to Ullmann, Encyclopadie der technischen Chemie, Vol. 2, part 1 (1961) 758 and following pages).

After the hydrothermal treatment at 195° C the specific surface was 65 m²/g and at 250° C, 22 m²/g.

What is claimed is:

1. Process for preparing substantially pure, spherical, porous silica particles having a grain size in the range of 0.001 to 3.0 mm and a metal oxide content of less than 1.0 percent by weight which comprises a. treating alkali polysilicate solution having a silica content of from 5 to 7.5 percent by weight i. batchwise by mixing and stirring with a cation exchange material to remove cations and filtering off the cation exchange material; and
ii. thereafter batchwise by mixing and stirring with an anion exchange material to remove mineral acids and filtering off the anion exchange material;
b. emulsifying and coagulating the treated solution from (a) in a water immiscible organic medium thereby forming said silica particles; and
c. recovering said silica particles having a grain size in the range of 0.001 to 3.0 mm and a metal oxide content of less than 1.0 percent by weight.

2. Process of claim 1 wherein said alkali polysilicate is sodium silicate.

3. Process of claim 1 wherein the organic medium is a neutral oil.

4. Process of claim 3 wherein said neutral oil has a viscosity in the range of 4 to 40 centiposie.

5. Process of claim 1 wherein stirring at a speed of 200 to 900 RPM is utilized in step (b).

* * * * *